(12) United States Patent (10) Patent No.: US 8,102,229 B2
Simon et al. (45) Date of Patent: Jan. 24, 2012

(54) SYSTEM FOR A LINEAR DRIVE

(75) Inventors: Olaf Simon, Bruchsal (DE); Jochen Mahlein, Karlsruhe (DE); Josef Schmidt, Graben-Neudorf (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 950 days.

(21) Appl. No.: 10/583,479

(22) PCT Filed: Nov. 23, 2004

(86) PCT No.: PCT/EP2004/013280
§ 371 (c)(1),
(2), (4) Date: Nov. 15, 2007

(87) PCT Pub. No.: WO2005/064764
PCT Pub. Date: Jul. 14, 2005

(65) Prior Publication Data
US 2008/0122294 A1    May 29, 2008

(30) Foreign Application Priority Data
Dec. 19, 2003   (DE) .................................. 103 60 599

(51) Int. Cl.
H01F 21/06 (2006.01)
(52) U.S. Cl. ........................................................ 336/130
(58) Field of Classification Search .......... 336/130–136; 307/17, 19, 104, 1
See application file for complete search history.

(56) References Cited

U.S. PATENT DOCUMENTS

| 4,242,666 | A | * | 12/1980 | Reschovsky et al. ..... 340/870.28 |
| 5,293,308 | A | | 3/1994 | Boys et al. |
| 5,301,096 | A | * | 4/1994 | Klontz et al. ................... 363/37 |
| 5,491,483 | A | * | 2/1996 | D'Hont ............................ 342/42 |
| 6,005,304 | A | | 12/1999 | Seelig |
| 6,089,512 | A | * | 7/2000 | Ansorge et al. ............... 246/194 |
| 6,425,468 | B1 | | 7/2002 | Yamamoto et al. |
| 7,084,527 | B2 | | 8/2006 | Futschek et al. |
| 2004/0051628 | A1 | | 3/2004 | Uhl |
| 2006/0209487 | A1 | | 9/2006 | Schmidt et al. |

FOREIGN PATENT DOCUMENTS

| DE | 44 46 779 | 6/1996 |
| DE | 100 14 954 | 10/2001 |
| DE | 100 53 373 | 5/2002 |
| DE | 101 12 892 | 10/2002 |
| DE | 103 12 792 | 8/2004 |
| DE | 103 12 284 | 10/2004 |
| DE | 103 38 852 | 3/2005 |
| DE | 103 39 340 | 4/2005 |
| DE | 103 49 242 | 4/2005 |
| DE | 103 44 144 | 5/2005 |
| GB | 2 100 069 | 12/1982 |
| WO | WO 92/17929 | 10/1992 |

OTHER PUBLICATIONS

International Preliminary Report on Patentability from International Application No. PCT/EP2004/013280, dated Nov. 23, 2004.

(Continued)

Primary Examiner — Tuyen Nguyen
(74) Attorney, Agent, or Firm — Kenyon & Kenyon LLP

(57) ABSTRACT

A system, whereby drive units on a movable part, e.g., a turntable or linear drive, are powered in a contactless manner via, in each instance, an inductive coupling to one or more primary conductors.

13 Claims, 16 Drawing Sheets

OTHER PUBLICATIONS

Written Opinion of the International Searching Authority, PCT International Patent Application No. PCT/EP2004/013280, dated Nov. 23, 2004.

International Search Report, PCT International Patent Application No. PCT/EP2004/013280, dated Jun. 9, 2005.

* cited by examiner

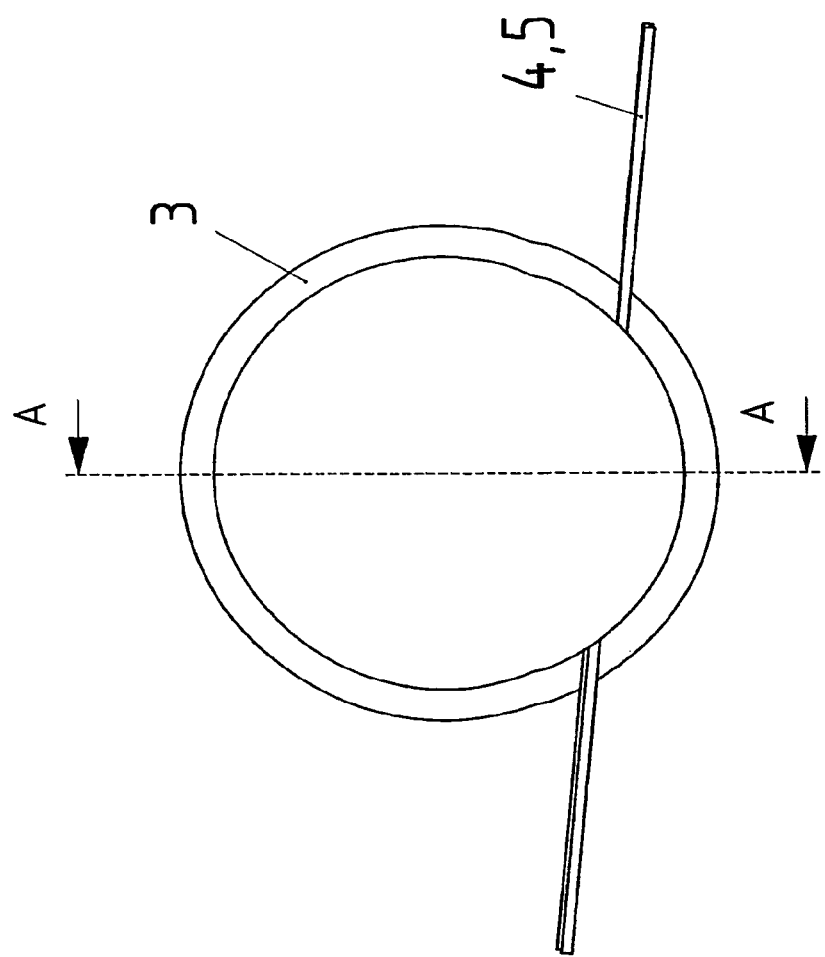
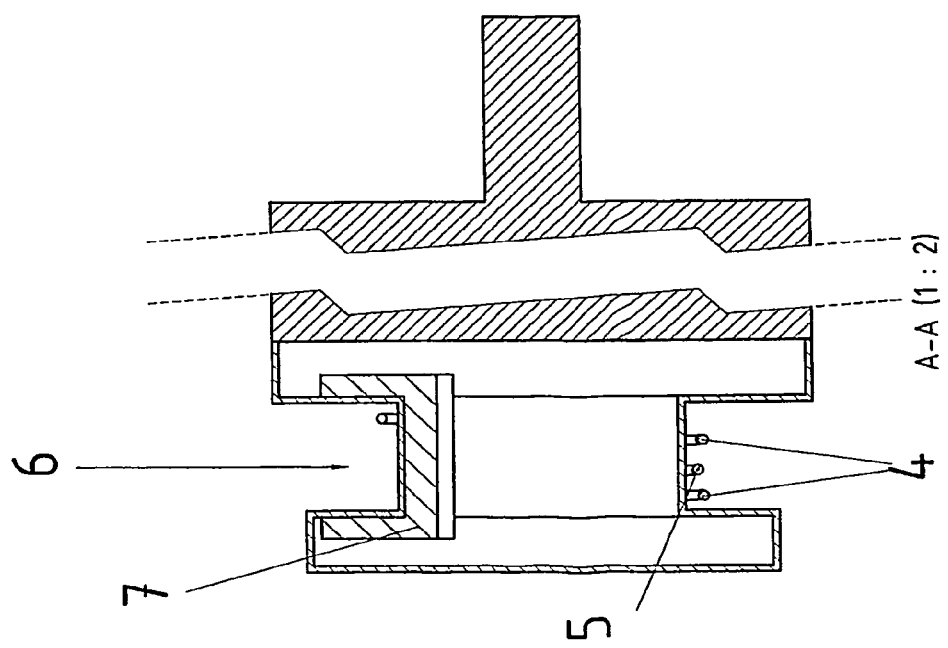

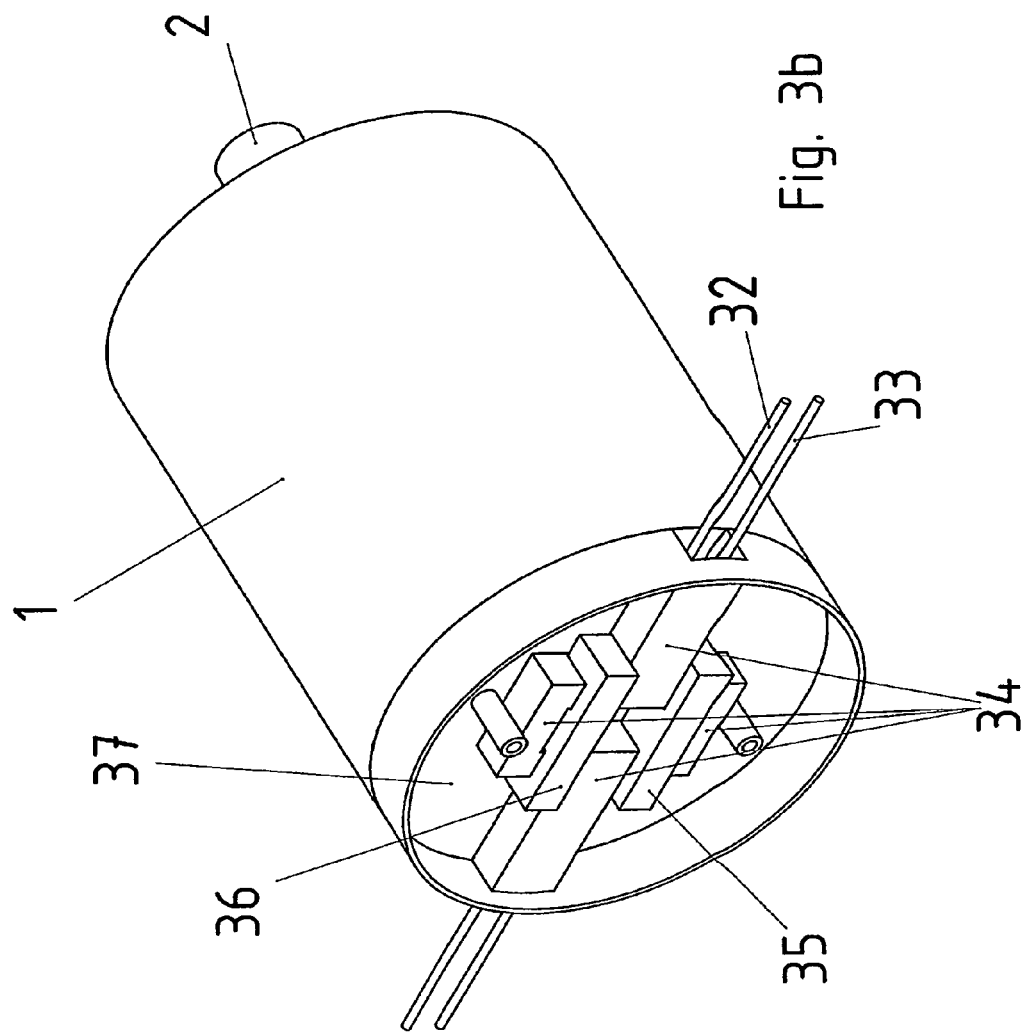

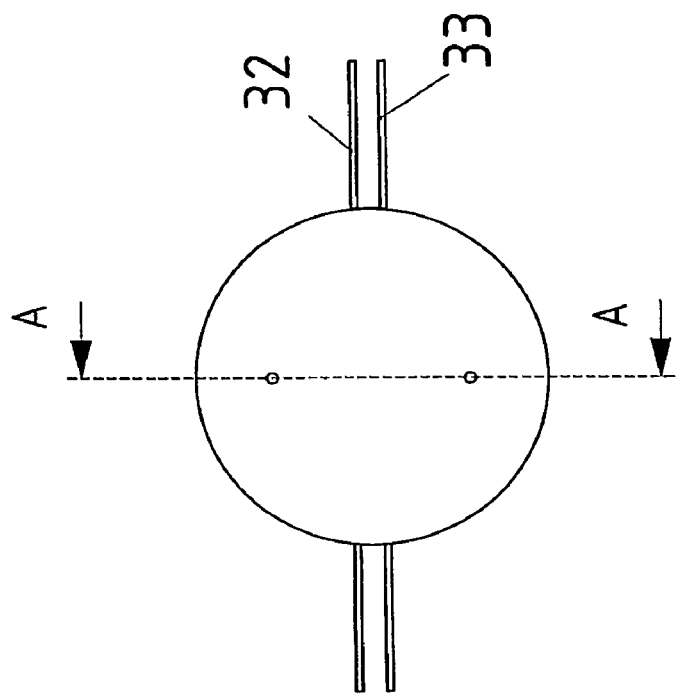
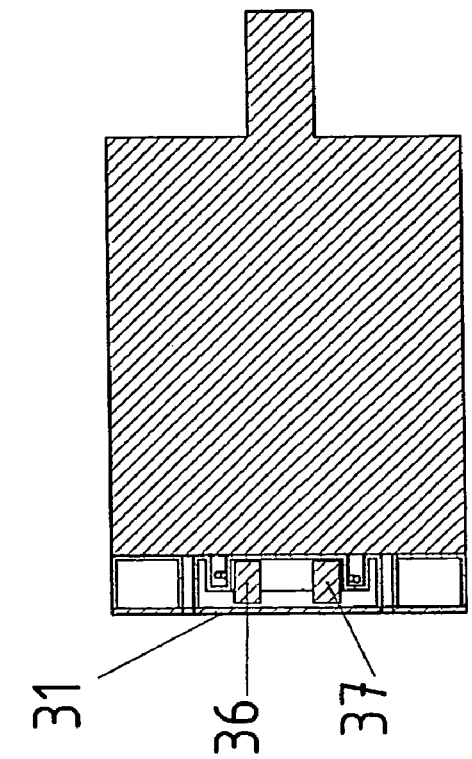
Fig. 3c
Fig. 3d

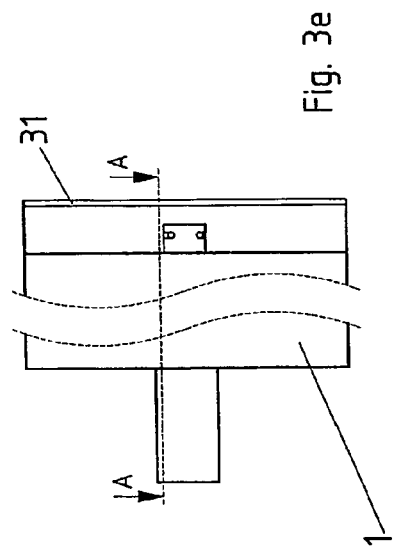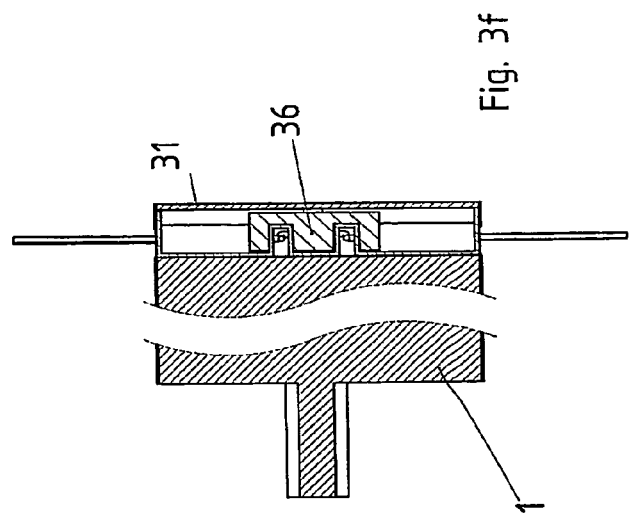

A-A (1:3)

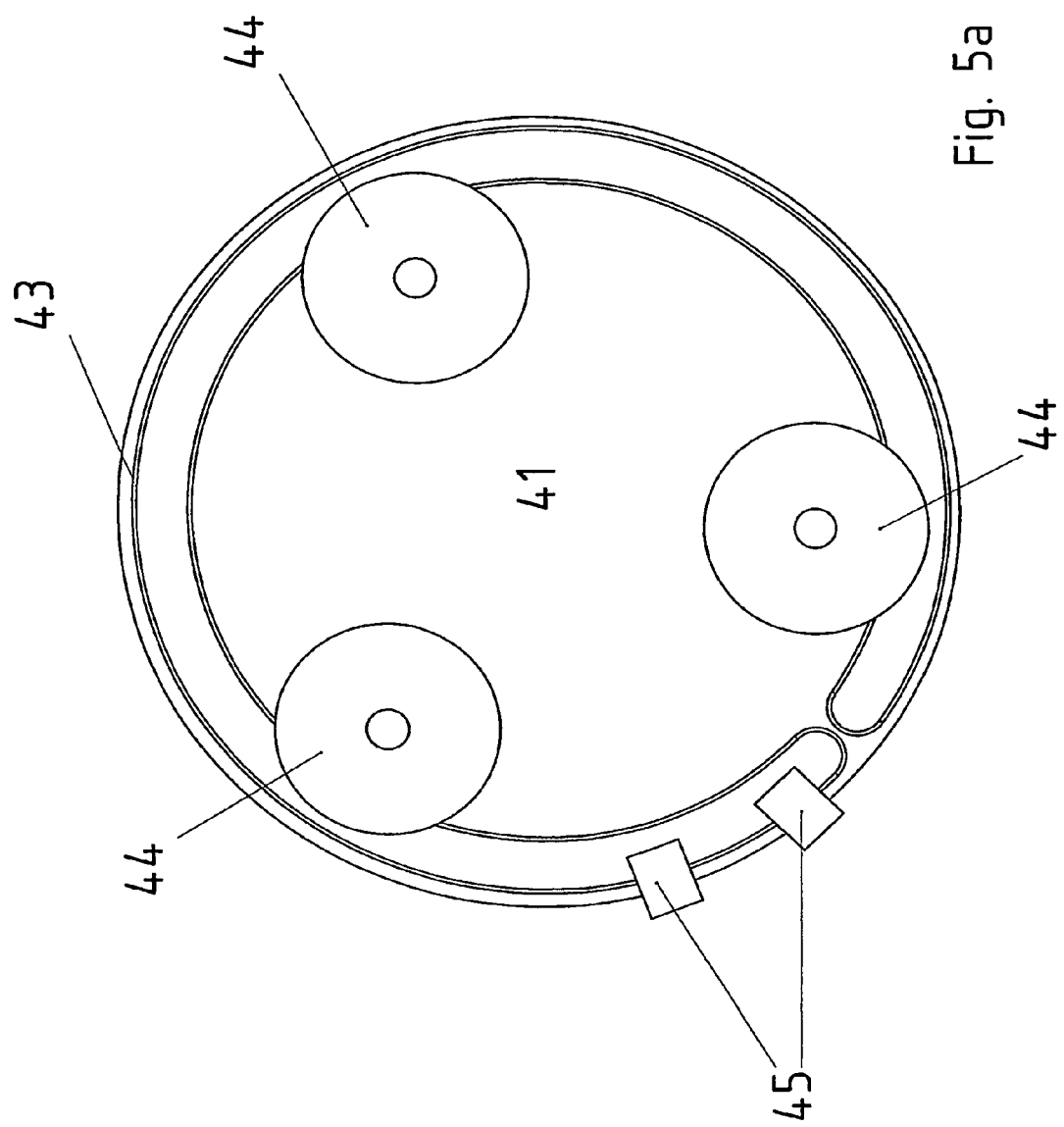

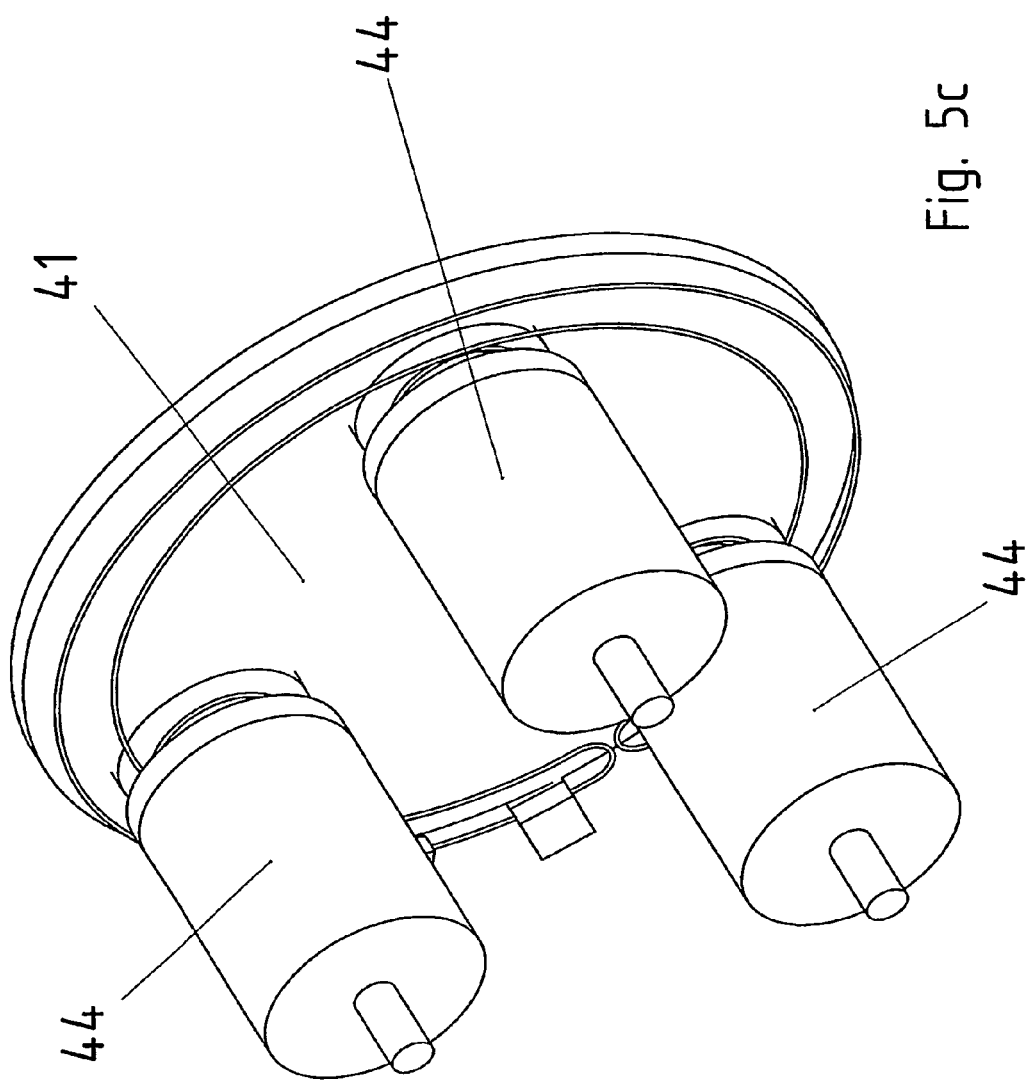

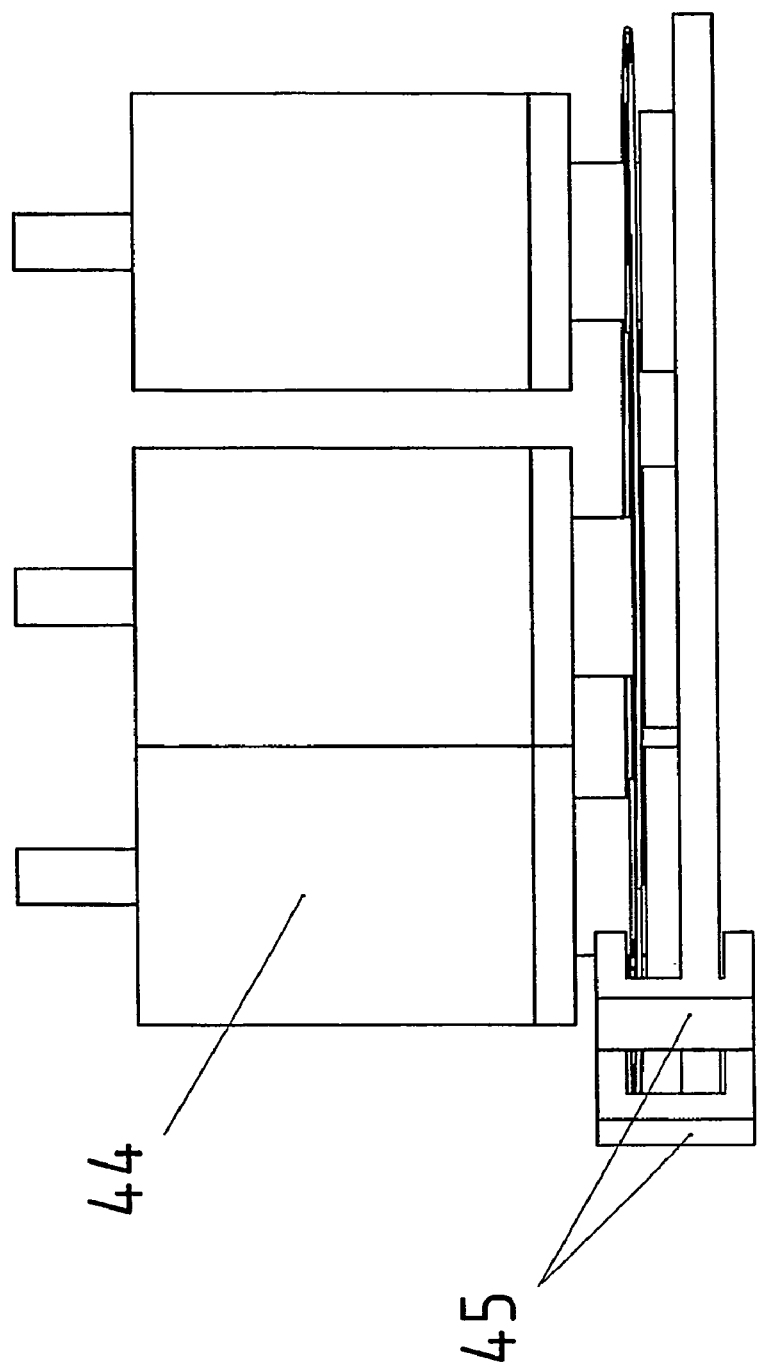

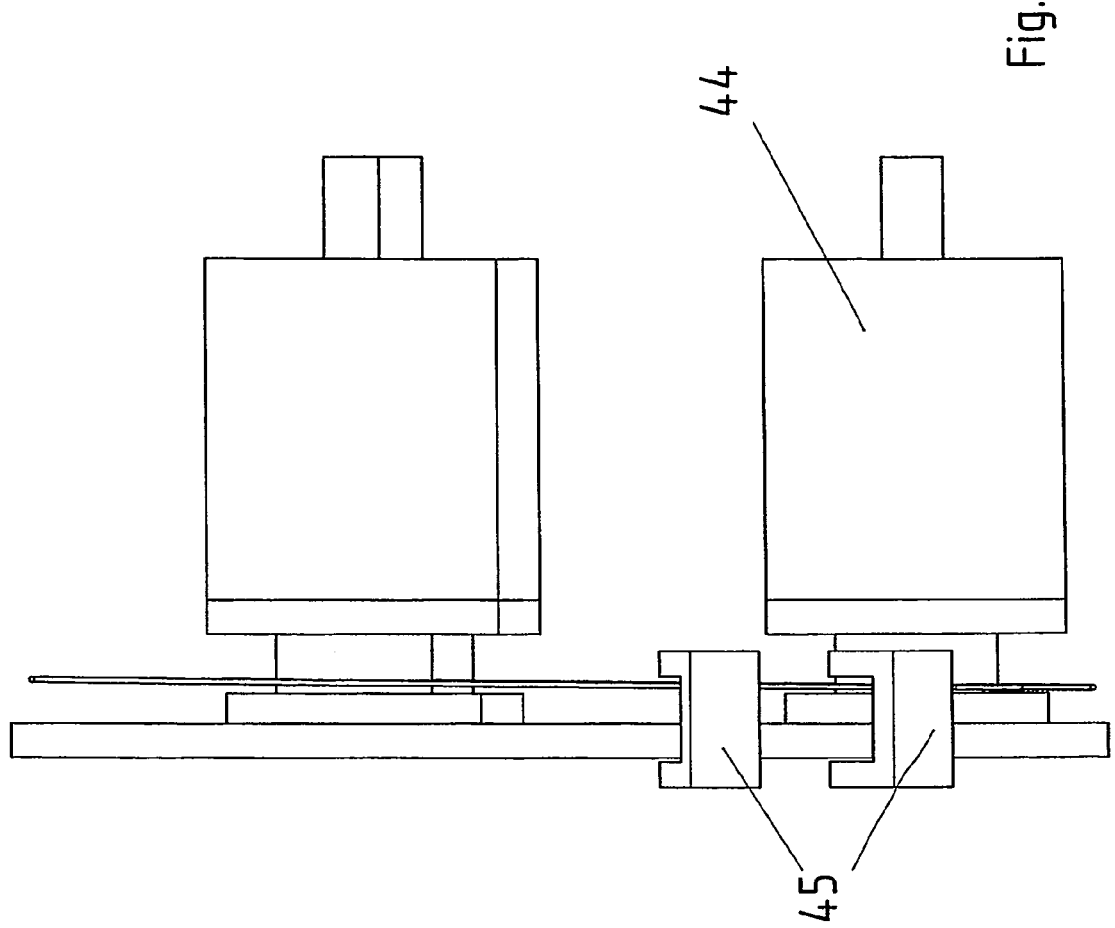

SYSTEM FOR A LINEAR DRIVE

FIELD OF THE INVENTION

The present invention relates to a system.

BACKGROUND INFORMATION

In industrial systems, it is conventional that drive units can be powered from a network. For this purpose, drive units are mostly connected via expensive plug-and-socket connectors. In addition, the system or machine has a T-piece for each drive unit as an energy branch. These T-pieces are difficult to install and expensive, in particular when they must be usable and provide a high degree of protection in wet areas or even aseptic areas.

SUMMARY

Example embodiments of the present invention may provide simpler and more cost-effective wiring in drive units and systems.

In the case of the system, features of example embodiments of the present invention include that it includes drive units, which are powered on a movable part, e.g., a turntable or linear drive, in a contact-free manner, using, in each instance, an inductive coupling to one or more primary conductors. In this context, it may be provided that the wiring may be implemented simply and rapidly and, in addition, in a well-arranged manner. Moreover, the system may be used in wet areas and in aseptic areas, since the inductive coupling allows the housing to be manufactured to be smooth. Furthermore, power is transmitted in an erosion-free manner.

It may also be provided that the power supply to the drive units is voltageless, and that the carrying-over of voltage otherwise present in systems, as well as spark-suppression devices in disconnecting switches, may be eliminated. In addition, reactive-power compensation is made possible, e.g., in the drive unit, and therefore the alternating current has smaller values, which is why smaller wire diameters may also be provided in the case of primary conductors, and lower wiring costs are therefore attainable. Disconnecting switches may be eliminated, since interruption may be replaced by extraction of the primary conductor.

The part may be rotationally mounted or linearly movable. In this context, it may be provided that the system may be manufactured as a turntable or a linear drive.

The primary conductor may power the drive units in series. This may provide that T-pieces are not necessary, and that highly cost-effective wiring is implementable, e.g., without plug-and-socket connectors, etc.

Example embodiments may provide for the primary conductor to be supplied with energy in a contactless manner via stationary coil cores including at least one coil winding, or to be supplied with energy via a loop wire. An aspect of the contactless transmission is that the movable part may be used, in turn, in wet areas or aseptic areas, and that no erosion occurs.

The primary conductor may be arranged as a closed loop. In this context, it may be provided that it is particularly cost-effective, and that no starting pieces or end pieces are necessary.

At least one drive unit may include an electric motor and an electronic circuit for powering the electric motor, the drive unit being able to be powered inductively. In this context, it may be provided that the drive unit may be manufactured in a cost-effective manner to be impervious and to provide a high degree of protection, for the contactless powering of the drive unit may allow the housing to be manufactured simply and easily, e.g., without uneven areas or plug-and-socket connectors, and therefore may allow water to drain off and the settling of solids to be prevented. Therefore, it may be particularly usable in wet areas and aseptic areas. The time necessary for wiring may be reduced.

A primary conductor provided on the drive unit such that an inductive coupling to a secondary winding contained by the drive unit is providable. In this context, it may be provided that a plug-and-socket connector is not necessary, and that the wiring may therefore be carried out in a simple and rapid manner. In addition, it is possible to reduce costs.

At least one primary conductor may be provided in a groove or a cable duct of the drive unit. In this context, it may be provided that the cable may be arranged very simply and rapidly, and that in addition, encapsulation with encapsulating material may be carried out.

At least one secondary winding may be wound around a U-shaped and/or E-shaped core. In this context, it may be provided that the design may be selected as a function of the utilized method and desired efficiency.

The primary conductors may be at least partially encapsulated and/or protected by a cover. This may provide that a particularly high degree of protection is attainable.

The drive unit may be impervious, smooth on the outer surface, and/or manufactured to have a high degree of protection. In this context; the drive unit may be provided, e.g., for use in wet areas and/or aseptic areas.

The drive unit may not include a plug-and-socket connector or other electrical connection terminals on its exterior. In this context, it may be provided that the drive unit may be easily manufactured to be impervious and to provide a high degree of protection.

LIST OF REFERENCE CHARACTERS 1 housing
2 rotor shaft
3 housing part
4 primary conductor
5 primary conductor
6 indentation
7 core having a U-shaped cross-section
21 primary conductor
22 primary conductor
23 clip
24 groove
25 groove
26 housing part
27 core having a U-shaped cross-section
28 second core having a U-shaped cross-section
31 cover
32 primary conductor
33 primary conductor
34 cable duct
35 core having an E-shaped profile
36 core having an E-shaped profile
37 printed circuit board
41 turntable
42 turntable drive
43 primary conductor
44 drive unit
45 stationary coil cores Example embodiments of the present invention are explained in more detail below with reference to the appended Figures.

BRIEF DESCRIPTION OF THE DRAWINGS

FIGS. 1a to 1c illustrate a drive unit according to an example embodiment of the present invention.

FIGS. 3a to 3h illustrate a drive unit according to an example embodiment of the present invention.

FIGS. 5a to 5g illustrate an example embodiment of the present invention.

DETAILED DESCRIPTION

Figure 1A:
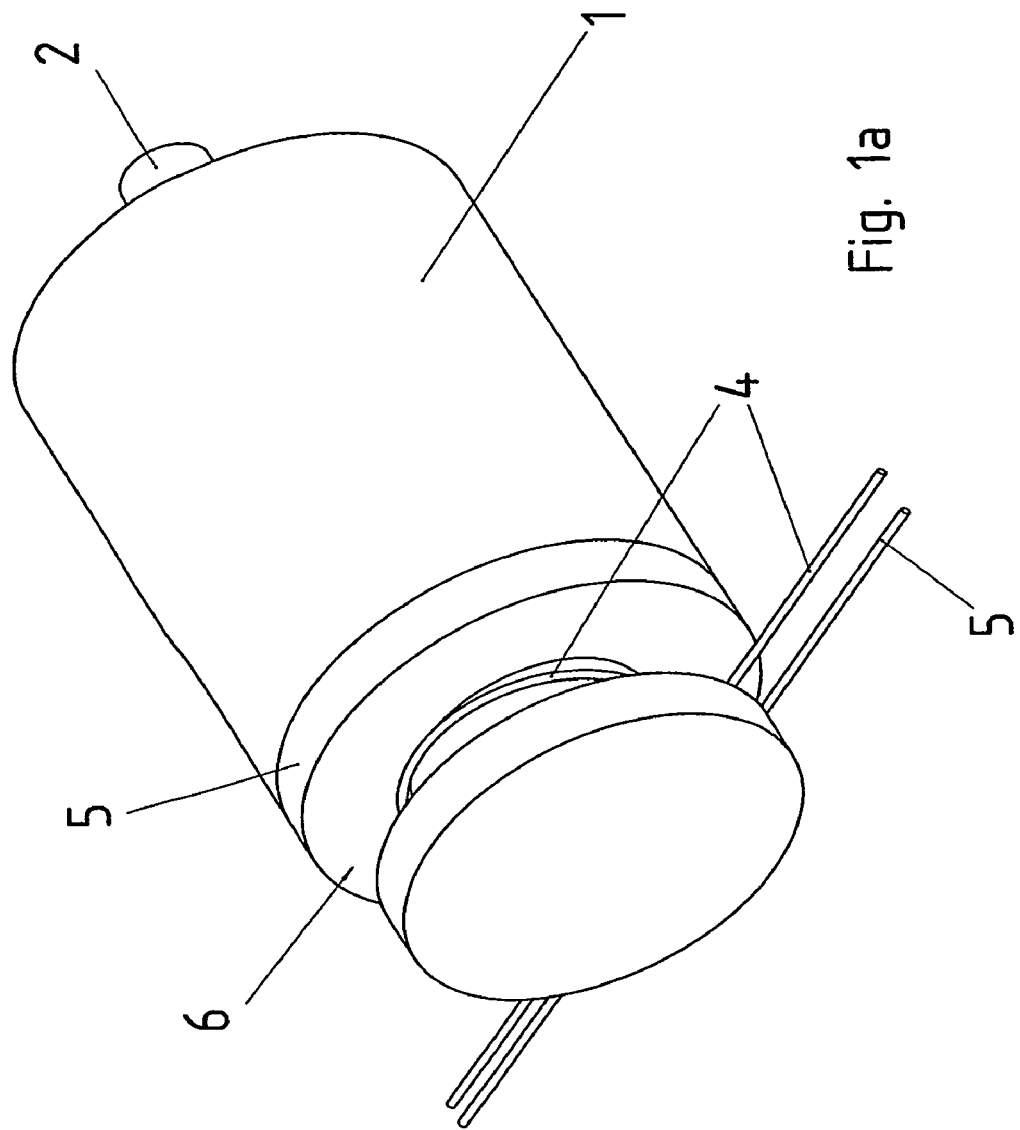

An isometric view, a sectional view, and a plan view of a drive unit according to an example embodiment of the present invention are illustrated in FIGS. 1a, 1b, and 1c. The drive unit includes an electric motor having a rotor shaft 2, which is surrounded by a housing 1. The electronic circuit for powering and controlling the electric motor is substantially protected by housing part 3, which has an indentation 6 in which a primary conductor is secured, using a winding loop. The return line, i.e., the second primary conductor, is only lead through, i.e., not wrapped around the drive unit.

Housing part 3 includes a core 7 having a U-shaped cross-section, around which a secondary winding is arranged that powers the electronic circuit. Therefore, the drive unit may be powered by the inductive coupling in a contactless manner, and is therefore galvanically separated from the primary circuit. The power supply of the drive unit may be disconnected rapidly and easily by unwinding or taking down the loop of the primary conductor.

The primary circuit is powered by a device, which exhibits a current-source behavior with respect to the primary current generated by it.

In further exemplary embodiments of the present invention, information is transmitted by modulating higher-frequency signals onto the primary conductor, as the electronic circuit includes device(s) for demodulating the signals. To exchange information, the electronic circuit also includes modulation device(s), which means that signals may also be modulated onto the primary conductor.

In this manner, the drive unit may be powered in a contactless manner. The consequence of this is that a powering principle may be realized in industrial systems and/or machines, in which during the installation of the drive units, these no longer need be electrically connected and wired with the aid of expensive plug-and-socket connectors, but rather it is sufficient for a primary conductor to be wrapped around in the indentation of the drive unit.

In addition, a high degree of protection may be realizable, since plug-and-socket connectors are eliminated and the drive unit may therefore be inexpensively manufactured, along with its housing, so as to be impervious. Therefore, the drive unit may be manufactured to have, e.g., a smooth housing and is consequently usable in aseptic applications or wet applications.

Device(s) for potential segregation and other separating devices may be eliminated, since the wall thickness of the housing may be appropriately dimensioned and the inductive coupling may be easily disconnected.

The electronic circuit also includes the secondary-side device(s) for transmitting power inductively, i.e., without contact. These devices may include passive components, i.e., capacitors and windings about coil cores. In a simple arrangement, the transformer head is wrapped with a winding in the form of a secondary winding, and a capacitor, whose capacitance is in resonance with the inductance of the winding, is connected in outgoing circuit, the resonance frequency corresponding to the frequency of the alternating current in the primary conductor or deviating from it by not more than, e.g., 10%.

The drive units may be powered in series by the primary conductor. It is possible to decouple individual motors without having to interrupt the power supply of the others. It may only be necessary to remove the primary-conductor loop around the drive unit, e.g., by lifting the conductor loop out of the indentation.

The wiring hereof may eliminate the need for T-pieces.

The drive unit is illustrated as a rotary drive in FIGS. 1a, 1b, and 1c. The drive unit may be implemented as a linear drive and may be inductively powered.

Figure 2A:
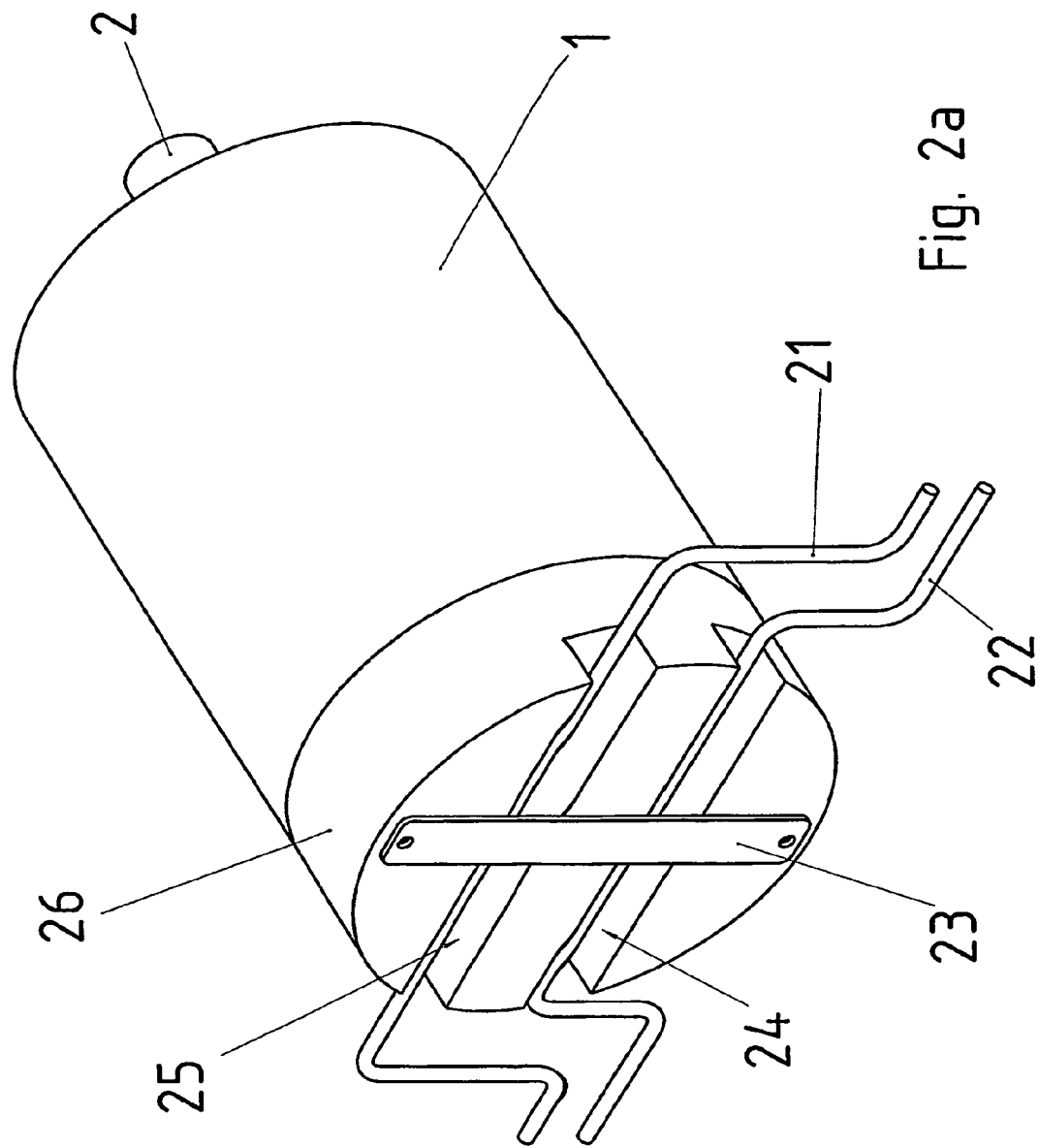
FIGS. 2a to 2c illustrate a drive unit according to an example embodiment of the present invention.
Figure 2C:
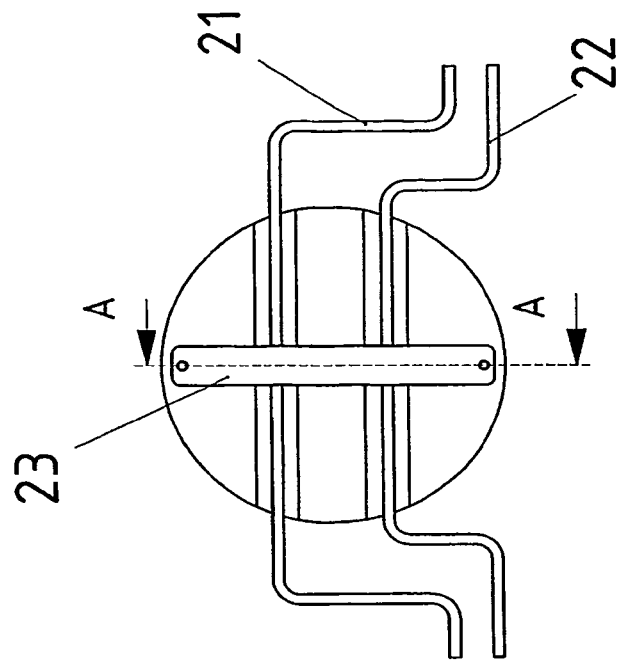
Figure 2B:
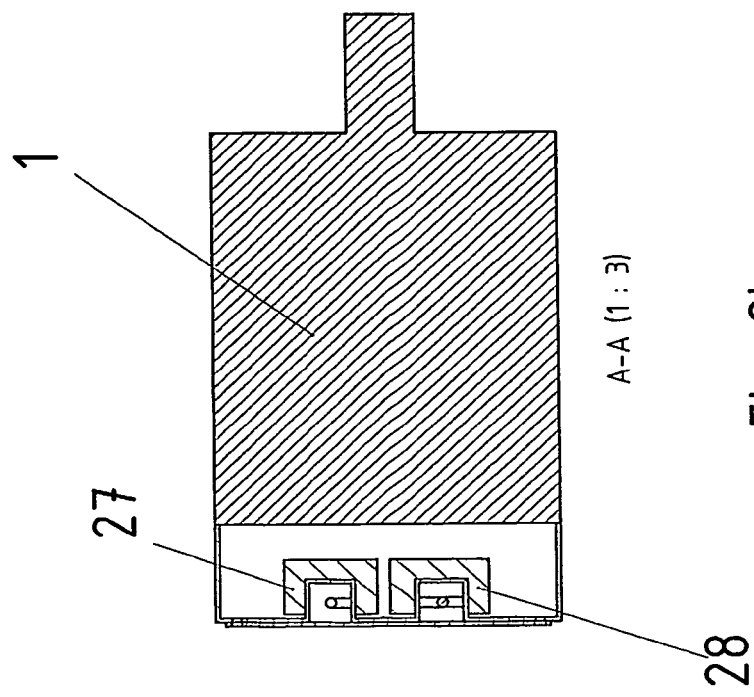

As illustrated in FIGS. 2a, 2b, and 2c, cores 27, 28 having a U-shaped cross-section may be located on the B-side with grooves for primary conductors 21 and 22. A clip 23 is used for fixing the primary conductors in position in their grooves. Only one core 27 may be necessary for functioning. Additional core 28 increases the efficiency of the entire device. The secondary windings on the two cores 27, 28 are interconnected and power the electronic circuit, which is, in turn, situated in the region of housing cover 26 that is provided on the B-side of housing 1.

Figure 3A:
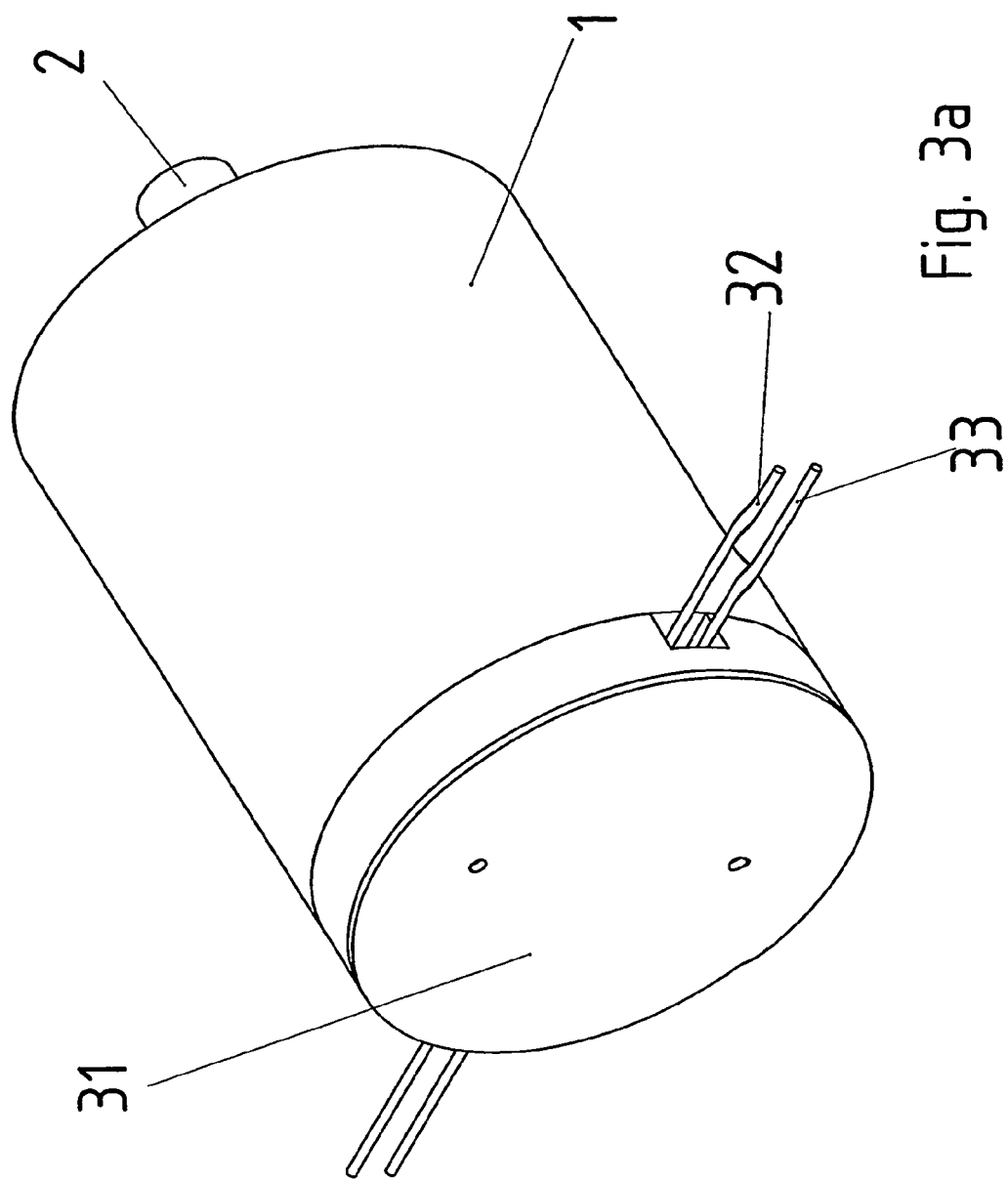
Figure 3H:
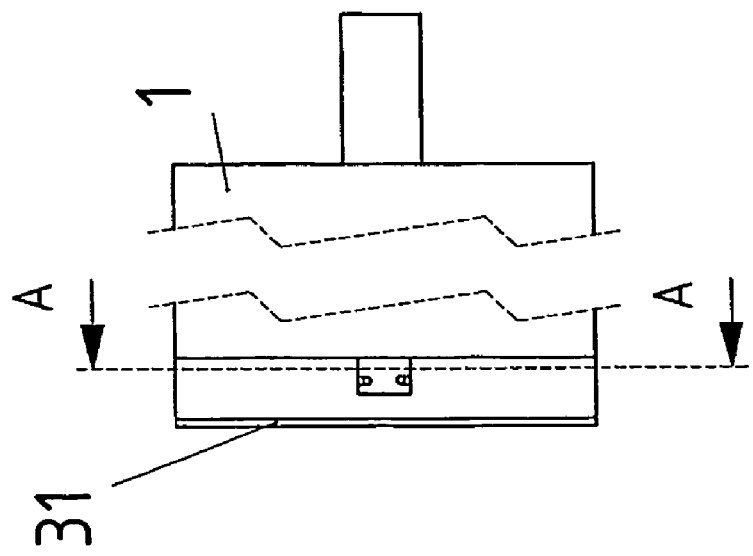
Figure 3G:
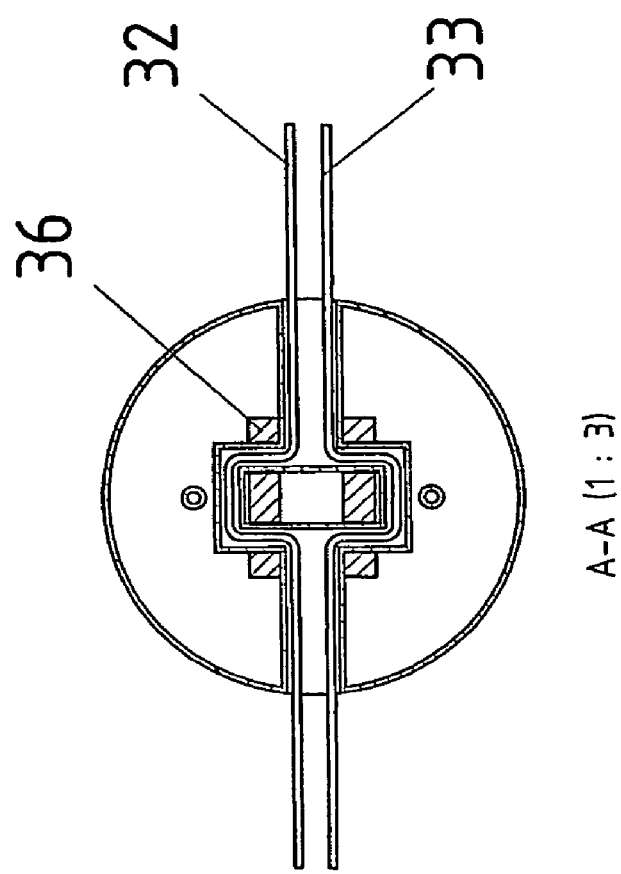

As illustrated in FIGS. 3a, 3b, 3c, 3d, 3e, 3f, 3g, and 3h, which illustrate different views, some that mask material components as in FIG. 3b, first primary conductor 32 is arranged in a cable duct 34, which is provided in a semi-loop pointing upwardly. Second primary conductor 33 is arranged in a corresponding semi-loop pointing downwardly. For purposes of inductive coupling, an E-shaped core 36 is provided in the upper semi-loop, and a second E-shaped core 35 is provided in the lower semi-loop, e.g., in the material of the cover. The legs of the E of the E-shaped cores are brought forward to housing part 37. Housing part 37 protects a printed circuit board that carries windings, which extend in the shape of a spiral, are produced as conductor tracks, and are provided as secondary windings. For example, a flat, E-shaped core is placed on this printed circuit board and oriented such that its legs meet the legs of E-shaped core 36 when extended. Therefore, a highly effective, inductive coupling is attainable, as indicated in FIG. 3i. The printed circuit board may also be fitted with additional electronic components.

The function of cover 31 illustrated in FIG. 3a is to provide mechanical protection, and to be a clamping device, i.e., strain-relief device. In FIG. 3b, the material of cover 31 is omitted, so that E-shaped cores 35, 36 are visible, as well as cable ducts 34. The cover may be detachably screwed to housing 1.

The cover may include magnetically conductive material for improved energy coupling. For example, this material may also be formed in the shape of a U or E.

Primary conductors 32, 33 in the cable ducts may be provided with encapsulating material for fixing them in position and sealing them.

Illustrated in 5a, 5b, 5c, 5d, 5e, 5f, and 5g are different views of an industrial system of an example embodiment of the present invention, which may include drive units as described above.

In this context, a turntable 41 driven by turntable drive 42 is rotatable relative to stationary coil cores 45, which carry a coil for generating a medium-frequency, alternating field. The primary conductor passes through stationary coil core 45 and is therefore inductively coupled to the coil. In this manner, power may be transmitted in a contactless manner from the coil to primary conductor 43, which leads, in turn, to drives 44 and powers them in a contactless manner. This may provide that in wet applications or aseptic applications, or in the food-processing and luxury-food industries, the system may therefore be manufactured to provide a particularly high degree of protection and to be easily cleanable. In addition, the primary conductor may be installed simply and rapidly, and the manufacturing costs and maintenance costs of the entire system may therefore be reducible.

The primary conductor may be arranged in a closed path and may be wound around each drive unit once.

Figure 4:
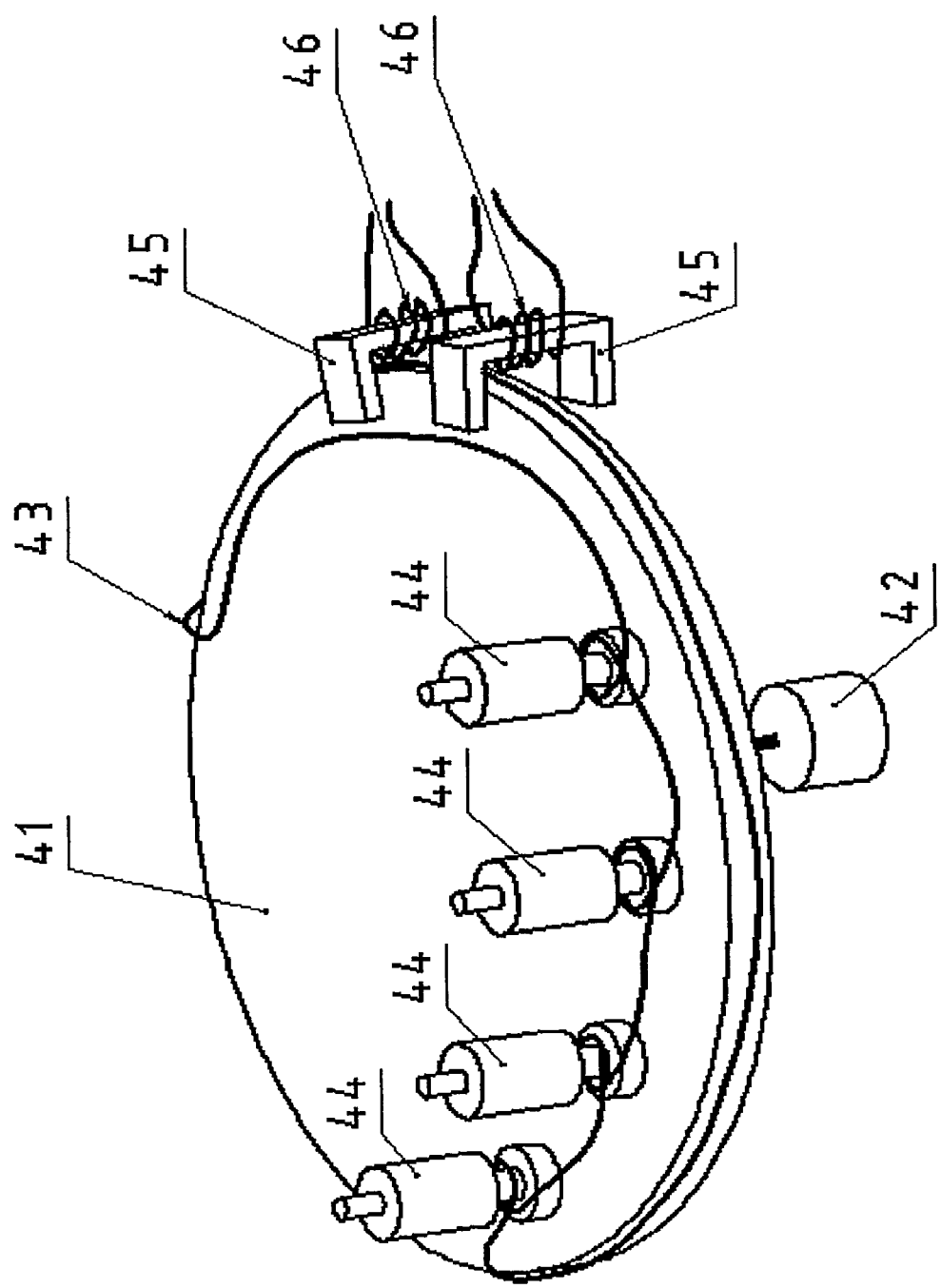
FIG. 4 illustrates an example embodiment of the present invention.

A corresponding, further exemplary embodiment of the present invention is illustrated in FIG. 4.

In exemplary embodiments of the present invention, the primary conductor is wound several times around a drive unit 44.

In exemplary embodiments of the present invention, primary conductor 43 is powered by a loop line instead of in a contactless manner.

Figure 5B:
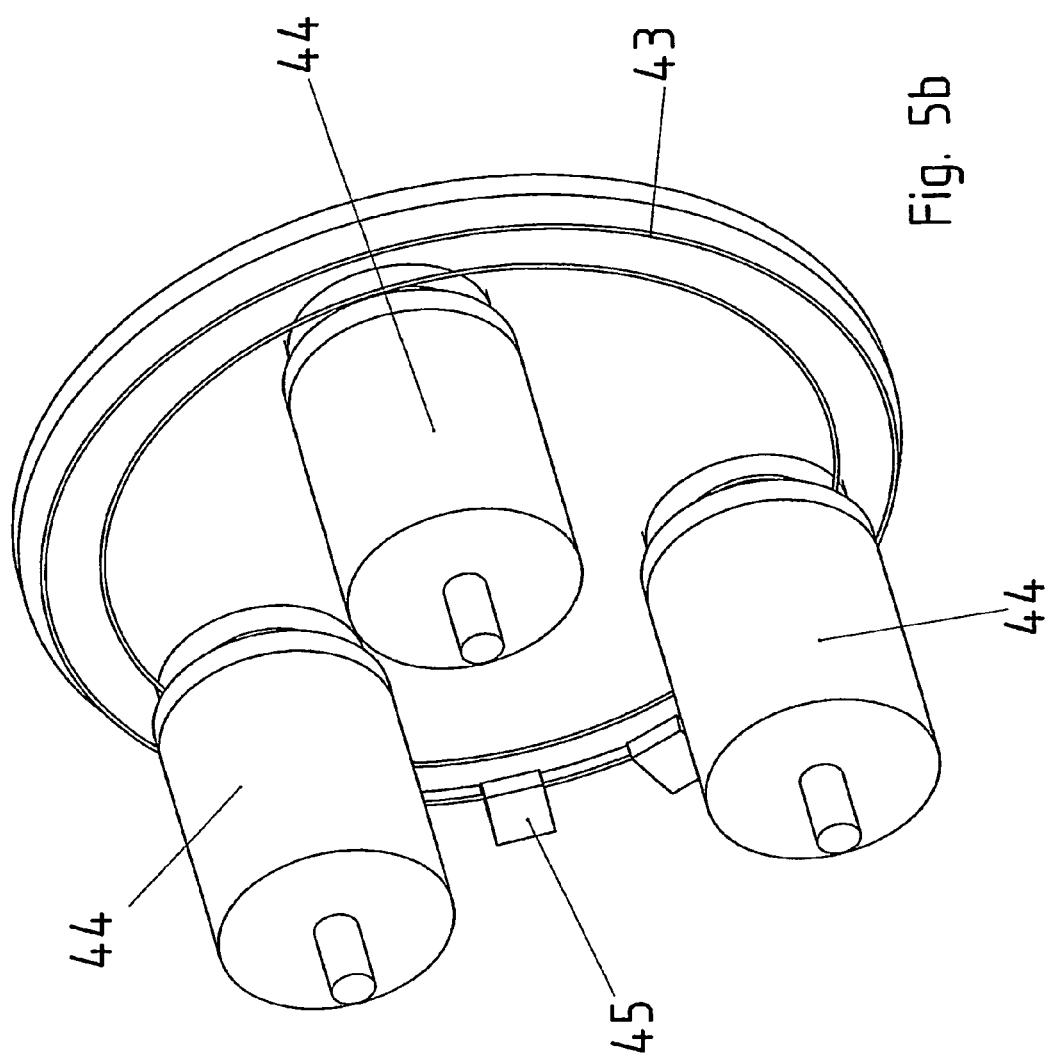
Figure 5E:
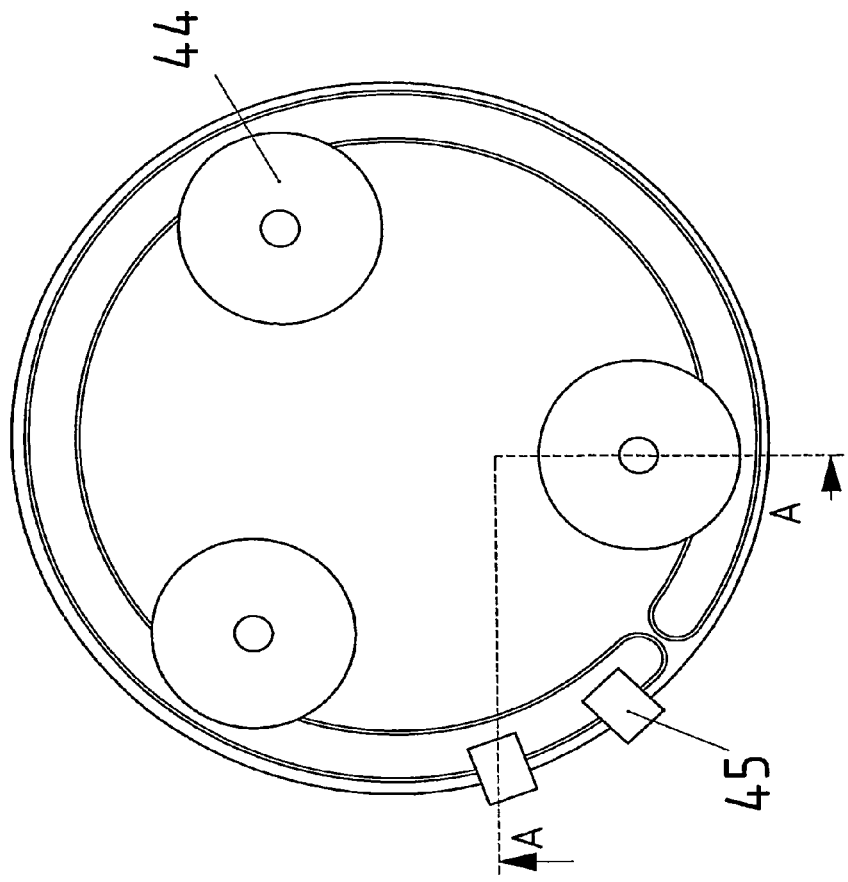
Figure 5D:
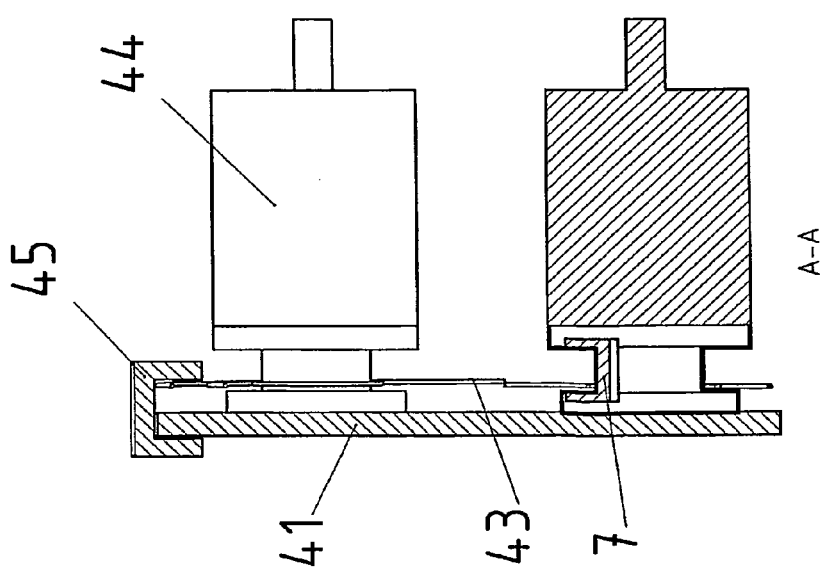

As illustrated in FIGS. 4 and 5, the drive units are mounted on a turntable 41. However, exemplary embodiments of the present invention also provide for the drive units to be positioned under the turn table or at other locations.

In exemplary embodiments of the present invention, a linearly movable table, on which the drive units are positioned, is provided in place of the turntable. The coil cores are positioned along the path of motion and power the primary conductor that is arranged in a substantially linear manner.

In exemplary embodiments of the present invention, such as those illustrated in FIG. 4 or FIG. 5, at least one different drive unit, such as that illustrated in FIG. 2 or 3 is used in place of the drive units illustrated in FIG. 1.

The method for contact-free energy transmission and the corresponding components may be implementable according to the features described, for example, in German Published Patent Application No. 100 53 373, German Published Patent Application No. 103 12 284, German Published Patent Application No. 103 12 792, German Published Patent Application No. 103 39 340, German Published Patent Application No. 103 38 852, German Published Patent Application No. 103 49 242, German Published Patent Application No. 103 44 144, German Published Patent Application No. 44 46 779, or also PCT International Published Patent Application No. WO 92/17929. In this context, it may be provided to use a medium frequency of approximately, e.g., 15 to 30 kHz. The adapter circuit following the transformer head, including the coil core, may be manufactured to be passive, i.e. without electronic power semiconductors.

What is claimed is:

1. A system, comprising:
   drive units arranged on a movable part, each drive unit powered in a contactless manner by an inductive coupling to at least one primary conductor;
   wherein the at least one primary conductor is removably fixed to the drive units on the movable part, the at least one primary conductor being provided in at least one of (a) an indentation and (b) a cable duct of the drive unit.

2. The system according to claim 1, wherein the movable part includes at least one of (a) a turntable and (b) a linear drive.

3. The system according to claim 1, wherein the movable part is one of (a) rotationally mounted and (b) linearly movable.

4. The system according to claim 1, wherein the primary conductor is adapted to power the drive units in series.

5. The system according to claim 1, wherein at least one of (a) the primary conductor is supplied with energy in a contactless manner by stationary coil cores including at least one coil winding and (b) the primary conductor is supplied with energy by a loop wire.

6. The system according to claim 1, wherein the primary conductor is arranged as a closed loop.

7. The system according to claim 1, wherein at least one drive unit includes an electric motor and an electronic circuit adapted to power the electric motor, the drive unit powered inductively.

8. The system according to claim 1, wherein a primary conductor is provided on the drive unit such that an inductive coupling to a secondary winding included in the drive unit is providable.

9. The system according to claim 1, wherein at least one secondary winding is wound around at least one of (a) a U-shaped and (b) an E-shaped core.

10. The system according to claim 1, wherein the primary conductors are at least one of (a) partially encapsulated and (b) protected by a cover.

11. The system according to claim 1, wherein at least one drive unit is arranged at least one of (a) impervious, (b) smooth on an outer surface, (c) to provide a high degree of protection and (d) for use in at least one of (a) wet areas and (b) aseptic areas.

12. The system according to claim 1, wherein the drive unit does not include a plug-and-socket connector or other electrical connection terminals on its exterior.

13. The system according to claim 1, wherein the drive unit is arranged such that information is transmittable by modulating higher-frequency signals onto the primary conductor.

* * * * *